US007555707B1

(12) United States Patent
Labarge et al.

(10) Patent No.: US 7,555,707 B1
(45) Date of Patent: Jun. 30, 2009

(54) METHOD AND SYSTEM FOR DATA BINDING IN A BLOCK STRUCTURED USER INTERFACE SCRIPTING LANGUAGE

(75) Inventors: Matthew Labarge, Seattle, WA (US); Igor Zaika, Kirkland, WA (US); William John Blewett, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 78 days.

(21) Appl. No.: 10/800,056

(22) Filed: Mar. 12, 2004

(51) Int. Cl.
G06F 17/00 (2006.01)
G06F 17/24 (2006.01)

(52) U.S. Cl. .................. 715/234; 715/239; 715/255; 715/271; 715/272; 715/273

(58) Field of Classification Search ............. 715/513, 715/523, 234, 239, 255, 271, 272, 273; 717/115
See application file for complete search history.

(56) References Cited

U.S. PATENT DOCUMENTS

| 5,155,806 A | 10/1992 | Hoeber et al. ............ 715/711 |
| 5,377,354 A | 12/1994 | Scannell et al. ........... 718/103 |
| 5,500,936 A | 3/1996 | Allen et al. ............... 395/156 |
| 5,519,606 A | 5/1996 | Frid-Nielsen et al. .......... 705/9 |
| 5,559,944 A | 9/1996 | Ono ....................... 715/841 |
| 5,570,109 A | 10/1996 | Jenson .................... 715/823 |
| 5,625,783 A | 4/1997 | Ezekiel et al. ............. 395/352 |
| 5,634,100 A | 5/1997 | Capps ......................... 705/9 |
| 5,634,128 A * | 5/1997 | Messina .................... 710/200 |
| 5,734,915 A | 3/1998 | Roewer .................... 395/773 |
| 5,760,768 A | 6/1998 | Gram ....................... 345/333 |
| 5,760,773 A | 6/1998 | Berman et al. ............. 715/808 |
| 5,761,646 A | 6/1998 | Frid-Nielsen et al. .......... 705/9 |
| 5,778,404 A | 7/1998 | Capps et al. ............... 715/531 |
| 5,805,167 A | 9/1998 | Van Cruyningen ........... 715/808 |
| 5,828,376 A | 10/1998 | Solimene et al. ............ 715/821 |
| 5,838,321 A | 11/1998 | Wolf ....................... 345/343 |
| 5,842,009 A | 11/1998 | Borovoy et al. ............... 707/1 |

(Continued)

FOREIGN PATENT DOCUMENTS

EP 1 223 503 7/2002

(Continued)

OTHER PUBLICATIONS

U.S. Appl. No. 11/154,278, filed Jun. 26, 2005 entitled "Cross Version and Cross Product User Interface Compatibility".

(Continued)

Primary Examiner—Doug Hutton
Assistant Examiner—Chau Nguyen
(74) Attorney, Agent, or Firm—Merchant & Gould, PC

(57) ABSTRACT

A method and system is generally directed to retrieving data from an external source and binding the data to a structure used in executing a UI script. The external source may be on a local machine located across a network. The UI script is transformed to a tree structure. The relevant portions of the tree structure are cloned and manipulated to insert the data from the external source. The cloned portions of the tree structure are then grafted back into the tree. The tree structure is then used to display the UI corresponding to the UI script that includes the data from the external source.

25 Claims, 5 Drawing Sheets

U.S. PATENT DOCUMENTS

| | | | | |
|---|---|---|---|---|
| 5,855,006 | A | 12/1998 | Huemoeller et al. | 705/9 |
| 5,898,436 | A | 4/1999 | Stewart et al. | 345/354 |
| 5,899,979 | A | 5/1999 | Miller et al. | 705/9 |
| 5,905,863 | A | 5/1999 | Knowles et al. | 709/206 |
| 5,926,806 | A | 7/1999 | Marshall et al. | 707/3 |
| 5,940,078 | A | 8/1999 | Nagarajayya et al. | 345/346 |
| 5,943,051 | A | 8/1999 | Onda et al. | 715/786 |
| 5,960,406 | A | 9/1999 | Rasansky et al. | 705/9 |
| 5,970,466 | A | 10/1999 | Detjen et al. | 705/8 |
| 5,999,938 | A | 12/1999 | Bliss et al. | 707/102 |
| 6,008,806 | A | 12/1999 | Nakajima et al. | 345/335 |
| 6,018,343 | A | 1/2000 | Wang et al. | 345/356 |
| 6,034,683 | A | 3/2000 | Mansour et al. | 715/764 |
| 6,133,915 | A | 10/2000 | Arcuri et al. | 715/779 |
| 6,175,363 | B1 | 1/2001 | Williams et al. | 345/334 |
| 6,278,450 | B1 | 8/2001 | Arcuri et al. | 345/334 |
| 6,373,507 | B1 | 4/2002 | Camara et al. | 345/825 |
| 6,384,849 | B1 | 5/2002 | Morcos et al. | 715/810 |
| 6,424,829 | B1 | 7/2002 | Kraft | 455/412.1 |
| 6,429,882 | B1 | 8/2002 | Abdelnur et al. | 345/763 |
| 6,433,801 | B1 | 8/2002 | Moon et al. | 345/840 |
| 6,456,304 | B1 | 9/2002 | Angiulo et al. | 345/779 |
| 6,459,441 | B1 | 10/2002 | Perroux et al. | 345/837 |
| 6,466,236 | B1 | 10/2002 | Pivowar et al. | 715/835 |
| 6,469,722 | B1 | 10/2002 | Kineo et al. | 345/837 |
| 6,480,865 | B1* | 11/2002 | Lee et al. | 715/523 |
| 6,493,006 | B1 | 12/2002 | Gourdol et al. | 715/825 |
| 6,546,417 | B1 | 4/2003 | Baker | 709/206 |
| 6,570,596 | B2 | 5/2003 | Frederiksen | 715/808 |
| 6,578,192 | B1* | 6/2003 | Boehme et al. | 717/115 |
| 6,618,732 | B1 | 9/2003 | White et al. | 707/103 |
| 6,621,504 | B1 | 9/2003 | Nadas et al. | 715/723 |
| 6,621,508 | B1 | 9/2003 | Shiraishi et al. | 715/810 |
| 6,635,089 | B1* | 10/2003 | Burkett et al. | 715/513 |
| 6,680,749 | B1 | 1/2004 | Anderson et al. | 348/231.99 |
| 6,686,938 | B1 | 2/2004 | Jobs et al. | 345/835 |
| 6,708,205 | B2 | 3/2004 | Sheldon et al. | 709/206 |
| 6,727,919 | B1 | 4/2004 | Reder et al. | 715/810 |
| 6,732,330 | B1* | 5/2004 | Claussen et al. | 715/513 |
| 6,734,880 | B2 | 5/2004 | Chang et al. | 715/738 |
| 6,750,890 | B1 | 6/2004 | Sugimoto | 715/838 |
| 6,785,868 | B1 | 8/2004 | Raff | 715/530 |
| 6,826,729 | B1 | 11/2004 | Giesen et al. | 715/837 |
| 6,871,195 | B2 | 3/2005 | Ryan et al. | 706/46 |
| 6,904,449 | B1 | 6/2005 | Quinones | 709/203 |
| 6,915,492 | B2 | 7/2005 | Kurtenbach et al. | 715/810 |
| 6,924,797 | B1 | 8/2005 | MacPhail | 345/326 |
| 6,964,025 | B2 | 11/2005 | Angiulo | 715/838 |
| 6,988,241 | B1 | 1/2006 | Guttman et al. | 715/503 |
| 6,990,637 | B2 | 1/2006 | Anthony et al. | 715/851 |
| 7,032,210 | B2* | 4/2006 | Alloing et al. | 717/106 |
| 7,039,596 | B1 | 5/2006 | Lu | 705/8 |
| 7,107,544 | B1 | 9/2006 | Luke | 715/752 |
| 7,110,936 | B2 | 9/2006 | Hiew et al. | 703/22 |
| 7,152,207 | B1 | 12/2006 | Underwood et al. | 715/526 |
| 7,188,073 | B1 | 3/2007 | Tam et al. | 705/9 |
| 7,325,204 | B2 | 1/2008 | Rogers | 715/792 |
| 7,346,705 | B2 | 3/2008 | Hullot et al. | 709/238 |
| 7,392,249 | B1 | 6/2008 | Harris et al. | 707/5 |
| 2002/0007380 | A1 | 1/2002 | Bauchot et al. | 707/530 |
| 2002/0037754 | A1 | 3/2002 | Hama et al. | 455/566 |
| 2002/0070977 | A1 | 6/2002 | Morcos et al. | 345/810 |
| 2002/0075330 | A1 | 6/2002 | Rosenzweig et al. | 345/854 |
| 2002/0078143 | A1 | 6/2002 | DeBoor et al. | |
| 2002/0091739 | A1 | 7/2002 | Ferlitsch | 707/526 |
| 2002/0122071 | A1 | 9/2002 | Camara et al. | |
| 2002/0133557 | A1 | 9/2002 | Winarski | 709/207 |
| 2002/0135621 | A1 | 9/2002 | Angiulo et al. | 345/838 |
| 2002/0140731 | A1* | 10/2002 | Subramaniam et al. | 345/762 |
| 2002/0140740 | A1 | 10/2002 | Chen | |
| 2002/0149623 | A1 | 10/2002 | West et al. | 345/765 |
| 2002/0163538 | A1 | 11/2002 | Shteyn | 345/752 |
| 2002/0175955 | A1 | 11/2002 | Gourdol et al. | 345/821 |
| 2002/0196293 | A1 | 12/2002 | Suppan et al. | 345/853 |
| 2003/0009455 | A1 | 1/2003 | Carlson et al. | 707/6 |
| 2003/0011638 | A1 | 1/2003 | Chung | 345/808 |
| 2003/0014490 | A1 | 1/2003 | Bates et al. | 709/206 |
| 2003/0035917 | A1 | 2/2003 | Hyman | 428/67 |
| 2003/0038832 | A1 | 2/2003 | Sobol | |
| 2003/0043211 | A1 | 3/2003 | Kremer et al. | |
| 2003/0066025 | A1 | 4/2003 | Garner et al. | 715/500 |
| 2003/0070143 | A1* | 4/2003 | Maslov | 715/513 |
| 2003/0097361 | A1 | 5/2003 | Huang et al. | 707/10 |
| 2003/0110191 | A1 | 6/2003 | Handsaker et al. | 707/503 |
| 2003/0167310 | A1 | 9/2003 | Moody et al. | 709/206 |
| 2003/0195937 | A1 | 10/2003 | Kircher et al. | 709/207 |
| 2003/0206646 | A1 | 11/2003 | Brackett | |
| 2003/0226106 | A1* | 12/2003 | McKellar et al. | 715/513 |
| 2003/0233419 | A1 | 12/2003 | Beringer | 709/206 |
| 2004/0012633 | A1 | 1/2004 | Helt | |
| 2004/0056894 | A1* | 3/2004 | Zaika et al. | 345/762 |
| 2004/0100504 | A1 | 5/2004 | Sommer | 345/810 |
| 2004/0109033 | A1 | 6/2004 | Vienneau et al. | 345/863 |
| 2004/0133854 | A1* | 7/2004 | Black | 715/517 |
| 2004/0186775 | A1 | 9/2004 | Margiloff et al. | 705/14 |
| 2004/0230508 | A1 | 11/2004 | Minnis, Jr. et al. | 705/35 |
| 2004/0230906 | A1* | 11/2004 | Pik et al. | 715/522 |
| 2004/0268231 | A1* | 12/2004 | Tunning | 715/513 |
| 2005/0005249 | A1 | 1/2005 | Hill et al. | 715/963 |
| 2005/0010871 | A1 | 1/2005 | Ruthfield et al. | 715/712 |
| 2005/0021504 | A1 | 1/2005 | Atchinson | 707/3 |
| 2005/0022116 | A1* | 1/2005 | Bowman et al. | 715/513 |
| 2005/0044500 | A1 | 2/2005 | Orimoto et al. | 715/706 |
| 2005/0172262 | A1 | 8/2005 | Lalwani | 717/109 |
| 2005/0183008 | A1 | 8/2005 | Crider et al. | 715/517 |
| 2005/0223329 | A1 | 10/2005 | Schwartz et al. | 715/711 |
| 2006/0036580 | A1 | 2/2006 | Stata | 707/3 |
| 2006/0036945 | A1 | 2/2006 | Radtke et al. | 715/708 |
| 2006/0101051 | A1* | 5/2006 | Carr et al. | 707/102 |
| 2006/0111931 | A1 | 5/2006 | Johnson et al. | 705/1 |
| 2006/0129937 | A1 | 6/2006 | Shafron | 715/733 |
| 2008/0077571 | A1 | 3/2008 | Harris et al. | 707/5 |
| 2008/0178110 | A1 | 7/2008 | Hill et al. | 715/771 |

FOREIGN PATENT DOCUMENTS

| | | |
|---|---|---|
| EP | 1 376 337 | 2/2004 |
| GB | 2 391 148 | 1/2004 |
| WO | WO 99/04353 A1 | 1/1999 |

OTHER PUBLICATIONS

U.S. Appl. No. 11/151,686, filed Jun. 13, 2005 entitled "Floating Command Object".

U.S. Appl. No. 11/401,470, filed Apr. 10, 2006 entitled "Command User Interface for Displaying Selectable Functionality Controls in a Database Application".

U.S. Appl. No. 10/982,073, filed Nov. 5, 2004 entitled "Gallery User Interface Controls".

U.S. Appl. No. 10/607,020, filed Jun. 26, 2003 entitled "Side-by-Side Shared Calendars".

U.S. Appl. No. 10/741,407, filed Dec. 19, 2003 entitled "Methods, Systems, and Computer-Readable Mediums for Providing Persisting and Continuously Updating Search Folders".

U.S. Appl. No. 11/782,059, filed Jul. 24, 2007 entitled "Methods, Systems, and Computer-Readable Mediums for Providing Persisting and Continuously Updating Search Folders".

U.S. Appl. No. 10/836,154, filed Apr. 30, 2004 entitled "Combined Content Selection and Display User Interface".

U.S. Appl. No. 10/848,774, filed May 19, 2004 entitled "Automatic Grouping of Electronic Mail".

U.S. Appl. No. 10/851,442, filed May 21, 2004 entitled "Conversation Grouping of Electronic Mail Records".

U.S. Appl. No. 10/851,506, filed May 21, 2004 entitled "Adaptive Multi-Line View User Interface".

U.S. Appl. No. 10/955,941, field Sep. 30, 2004 entitled "An Improved User Interface for Displaying Selectable Software Functionality Controls that are Relevant to a Selected Object".
U.S. Appl. No. 10/955,940, field Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out." 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999.
Becker et al., "Vitrual Folders: Database Support for Electronic Messages Classification," Pontificia Universidade Catolica do Rio Grande do Sul, Porto Alegre, Brazil, pp. 163-170.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version 2002.03.25, http://www.uakron.edu/its/learning/training/docs/Calendar032502.pdf, Mar. 25, 2002, pp. 1-52.
Screen Dumps of Microsoft Outlook (1999, pp. 1-3).
"To-do-List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
U.S. Office Action dated Dec. 23, 2003 cited in U.S. Appl. No. 09/896,384.
U.S. Notice Allowance dated Aug. 24, 2004 cited in U.S. Appl. No. 09/896,384.
U.S. Office Action dated Apr. 12, 2007 cited in U.S. Appl. No. 10/851,506.
U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.
U.S. Office Action dated Jun. 21, 2007 cited in U.S. Appl. No. 10/955,928.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,967.
U.S. Office Action dated Jul. 11, 2007 cited in U.S. Appl. No. 10/955,942.
U.S. Office Action dated Sep. 26, 2007 cited in U.S. Appl. No. 11/151,686.
U.S. Official Action dated Oct. 9, 2007 cited in U.S. Appl. No. 10/982,073.
Microsoft Office 11 Beta Layperson's Specification, Copyright 2002, Microsoft Corporation, 28 pages.
FrontPage 11 Beta Layperson's Specification, Copyright 2002, Microsoft Corporation, 12 pages.
Office 11 Beta Letter, Copyright 2002, Microsoft Corporation, 6 pages.
Microsoft XDocs Beta Layperson Specification, Copyright 2002, Microsoft Corporation, 3 pages.
Microsoft Publisher 11 Beta Layperson's Specification, Copyright 2002, Microsoft Corporation, 13 pages.
Marshall School of Business, Worshop 1—Introdcution to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141, 143.

Gina Danielle Venolia et al., Understanding Sequence and Reply Relationships within Email Conversations: A Mixed-Model Visualization, CHI 2003, Apr. 5-10, 2003, Volume No. 5, Issue No. 1, pp. 361-368.
Screen Dumps Microsoft Corporation, Microsoft Office Professional Edition 2003, 4 pp.
Screen Dumps Microsoft Corporation, Microsoft Office Professional Edition 2003, 5 pp.
Habraken, Microsoft Office XP 8 in 1, published Jun. 5, 2001, http://proquest.safaribooksonline.com/0789725096/, 12 pp.
Word 2002, Chapter 14; Paradigm Publishing Inc., copyright 2002; http://www.emcp.com/tech_tutorials/sig_irc/Signature_Word_Chapter_14.ppt, 21 pp.
Microsoft Office Word 2003, Part of Microsoft Office Professional Edition 2003, 1983-2003 Microsoft Corporation, 5 pp.
Danish Written Opinion Appl. No. SG 200504508-3 dated Sep. 18, 2006.
Danish Search Report Appl. No. SG 200504475-5 dated Sep. 19, 2006.
NZ Application No. 541300, Examination Report dated Jul. 25, 2005.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
Chinese First Office Action dated Mar. 21, 2008 cited in Appln No. 200510092146.4.
Chinese First Office Action dated Mar. 21, 2008 cited in Appln No. 200510092139.4.
Chinese First Office Action dated Apr. 11, 2008 cited in Appln No. 200510092141.1.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Apr. 21, 2008 cited in Appln No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 20, 2008 in U.S. Appl. No. 10/848,774.
U.S. Official Action dated Feb. 21, 2008 in U.S. Appl. No. 10/851,442.
U.S. Official Action dated Apr. 15, 2008 in U.S. Appl. No. 10/955,942.
U.S. Official Action dated Apr. 16, 2008 in U.S. Appl. No. 10/955,967.
U.S. Official Action dated Apr. 29, 2008 cited in U.S. Appl. No. 10/955,941.
U.S. Official Action dated May 28, 2008 cited in U.S. Appl. No. 10/982,073.
U.S. Official Action dated Jul. 24, 2008 cited in U.S. Appl. No. 11/151,686.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Sep. 12, 2008 cited in Appln No. 12005000406.
Microsoft Office Word 2003, Part of Microsoft Office Professional Edition 2003, 1983-2003 Microsoft Corporation, screen shot 1, 1 pp.
Microsoft Office Word 2003, Microsoft Office Professional Edition 2003, Microsoft Corporation, 10 pages.
Screendumps - Microsoft Office, Microsoft Office Professional Edition 2003, Microsoft Corporation, 10 pages.
Screendumps - Microsoft Office Outlook, Microsoft Office Outlook Professional Edition 2003, Microsoft Corporation, 2 pages.
Chinese Second Office Action dated Nov. 21, 2008 cited in Appl. No. 200510089514.X.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 23, 2008 cited in U.S. Appl. No. 10/955,942.
U.S. Official Action dated Dec. 24, 2008 cited in U.S. Appl. No. 10/955,967.
U.S. Official Action dated Jan. 6, 2009 cited in U.S. Appl. No. 10/955,941.

* cited by examiner

METHOD AND SYSTEM FOR DATA BINDING IN A BLOCK STRUCTURED USER INTERFACE SCRIPTING LANGUAGE

BACKGROUND OF THE INVENTION

A User Interface (UI) scripting language defines the layout of UI components on the output of a computing device. Typical components of the UI might be menus, buttons or check boxes. For each component there is usually additional information such as position, size, color and textual or pictorial content.

Typically, as with other types of scripting languages, a UI written in a block structured UI scripting language is often hand-authored to include the desired components for display and the layout of those components. However, hand-authoring the UI limits the UI to the components and the layout defined at the time of authoring creating difficulties in adding certain dynamic data to the UI. For example, a set of links to web pages may be included on the UI that are dynamic and generated from an external source (e.g., a server) at run time. Run time is defined as the time during which the User Interface component is being displayed or used. Custom code could be written and then spliced into the UI for displaying the dynamic data, but this method may be cumbersome and difficult in a block structured scripting language. What is needed is a way to update data from an external data source in a block structured UI scripting language without requiring the use of custom code.

SUMMARY OF THE INVENTION

The present invention provides a method and system for an extension of a User Interface scripting language in order to allow the attributes of any component to be repeatedly updated at "run time" from an external data source. An example of an external data source might be a database on a separate computer.

In one embodiment, the present invention includes three tags that are used within XML (Extensible Markup Language). The three tags may be referred to as the "Reference" tag, the "ReferenceTemplate" tag, and the "ReferenceMerge" tag, however other names may be used. The Reference tag indicates UI script that has associated data binding elements. The ReferenceTemplate tag and the ReferenceMerge tag implement the data binding functionality.

In a further embodiment, the UI script is transformed to a tree structure. The relevant portions of the tree structure are cloned and manipulated to insert the data from the external source. The cloned portions of the tree structure are then grafted back into the tree. The tree structure is then used to display the UI corresponding to the UI script that includes the data from the external source. In one embodiment, the cloned portions of the tree correspond to the portions of the tree associated with Reference-Template and ReferenceMerge tags.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
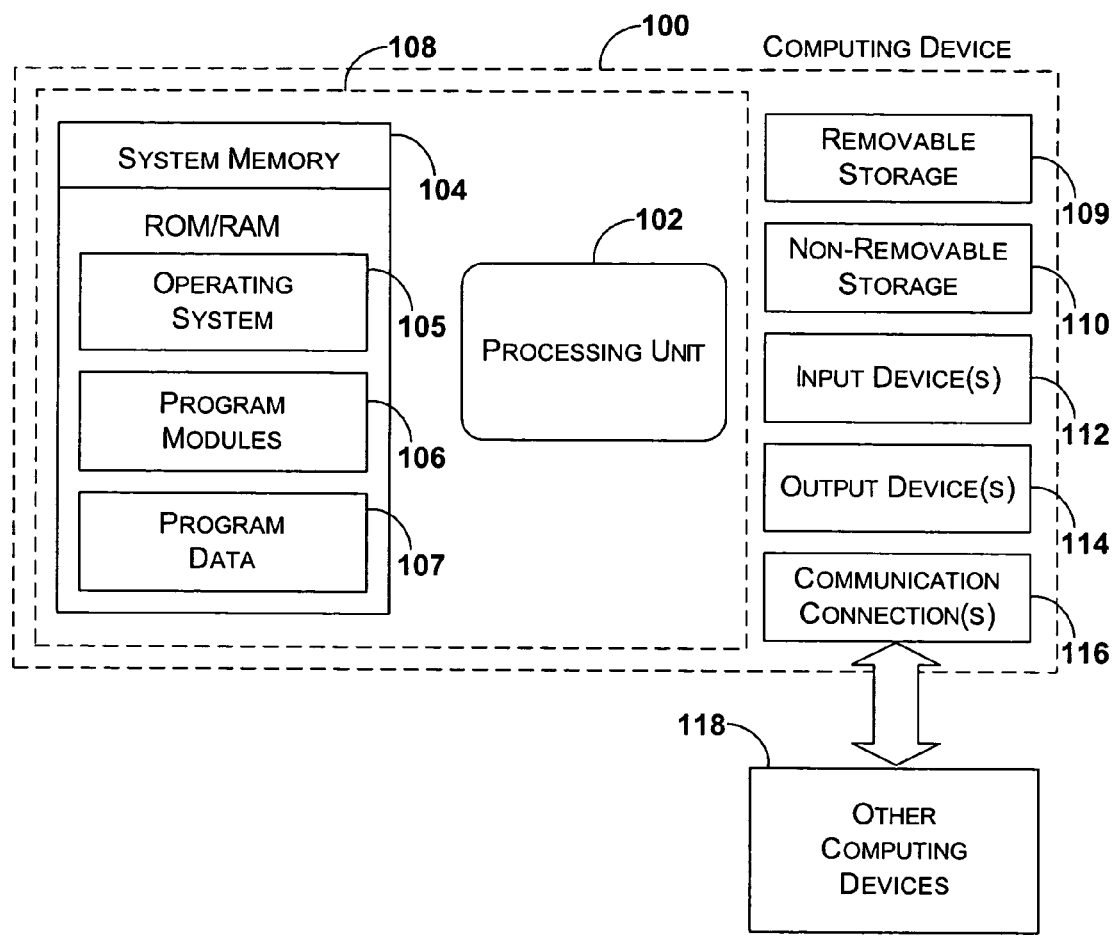
FIG. 1 illustrates an exemplary computing device that may be used in one exemplary embodiment of the present invention.

FIG. 1 shows an exemplary computing device that may be included in system 100 for implementing the invention. Computing device 100 illustrates a general operating environment that may apply to the present invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, the system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, stylus, voice input device, touch input device, etc. Output device(s)

114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Data Binding

The present invention is generally directed to retrieving data from an external source and binding the data to a structure used in executing a UI script. The external source may be on a local machine located across a network. The retrieval of the data from the external source may happen once (e.g., when the rest of the UI is loaded) or many times over the lifetime of the UI.

Figure 2:
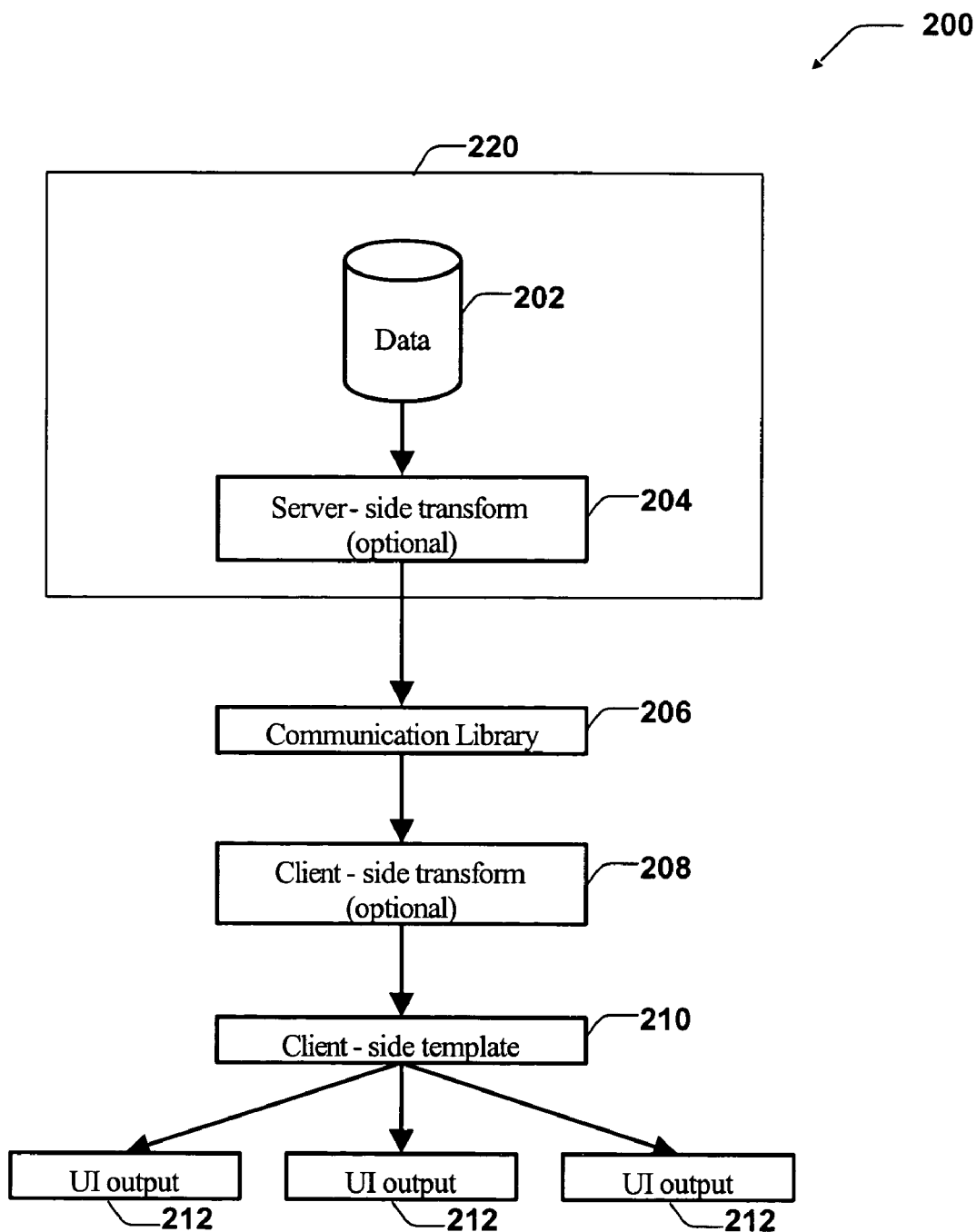
FIG. 2 illustrates an exemplary block diagram for a data transformation pipeline in accordance with the present invention.

FIG. 2 illustrates an exemplary block diagram for a data transformation pipeline in accordance with the present invention. Block diagram 200 includes data 202, optional server-side transform 204, communication library 206, optional client-side transform 208, client-side template 210, and UI outputs 212. Data 202 and optional server-side transform 204 are located on server 220.

Communication library 206 may be used to retrieve data 202 from the remote location. Depending on the type of data, certain security precautions may be used in transmitting the data. In one embodiment, secure communication is required for any personal data, and publicly available data is more easily transmitted in clear text.

To retrieve data 202, a URL (uniform resource locator) is passed from client-side template 210 to communication library 206. Communication library 206 then requests data 202 according to the URL from server 220, which may have gone through a server transformation through optional server-side transform 204. If data 202 is transformed on the server side, client-side transform 208 retransforms data 202 before sending the data through client-side template 210 to produce UI outputs 212. In another embodiment, the script may also be produced server-side instead of using client-side template 210. By not specifying a template on the client, the raw script from server 220 is inserted directly into a document tree used for producing the UI output.

Figure 3:
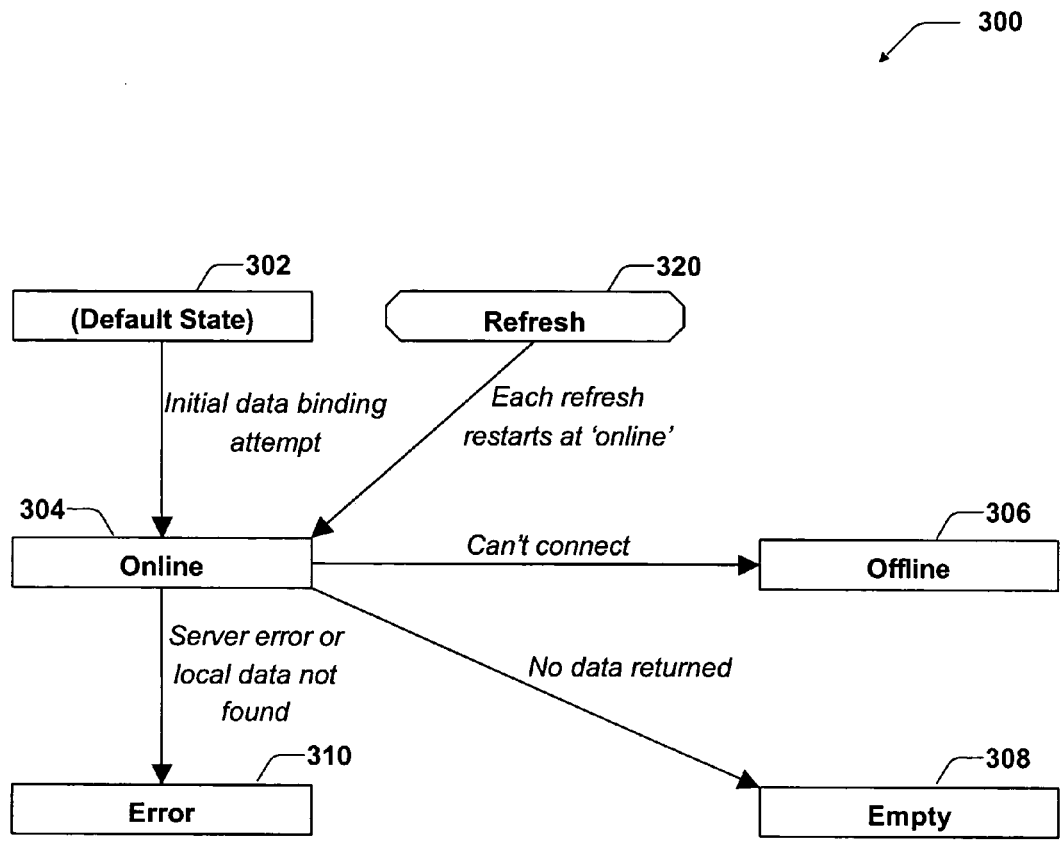
FIG. 3 illustrates an exemplary state table and scenarios for presenting UI depending on the server state in accordance with the present invention.

FIG. 3 illustrates an exemplary state table and scenarios for presenting UI depending on the server state in accordance with the present invention. State table 300 includes the following states: default 302, online 304, offline 306, empty 308, and error 308. Additionally, a refresh of the UI is indicated by refresh 320, wherein the UI is refreshed to update data and other changes.

Each data binding tag is in one state at a time, and moves from state to state as the connection or server situation changes. The present invention provides a wide range of flexibility by allowing users to supply different templates (and even different data) per state.

Default 302 is the state denoted by the empty string. Default 302 is the state any data binding is considered to be in until another state is achieved. In particular, when data is remote, it may take a few seconds to reach the "online" state, during which time the default state is shown. Default 302 includes content indicating that the actual content is in the process of being retrieved.

Online 304 indicates the presence of data that refreshes as often as specified by an interval attribute that may be included in a tag of the UI script. Offline 306 indicates that the data source defined in online 304 can't be retrieved because the server can't be contacted (e.g., because of a failure in connecting to the network, as different from a failure at the server). Offline 306 allows a secondary data source (e.g. an offline cache, etc.) to be defined to attempt a secondary retrieval of the data. Empty 308 indicates that the server returned a response that no data matched the query. Reaching the empty state means that records were expected but not found. Error 310 is reached when a problem with the server prevented the data from being retrieved and an alternative action is not triggered. Error 310 may be reached due to a timeout or corrupted return value.

Whenever a state transition occurs, a refresh timer of refresh 320 is reset to the value of the interval attribute of the new state. If the new state does not specify an interval, then the interval attribute of the online state is used. In one implementation of data binding the refresh timer is not reset if the interval value is zero, negative or not provided in the script.

As previously indicated, one embodiment of the present invention operates within the context of an extensible markup language (XML). A scripting language that conforms to the rules of XML consists of a set of tags. Each tag may have a set of zero or more attributes that modify it. In a User Interface scripting language the tags typically refer to types of user interface components such as menus, buttons, check boxes, edit boxes, text boxes, lists or links. The attributes of a tag typically convey such information as position, size, color and textual or pictorial content of the component associated with the tag. A script is a document (or set of documents) written in the scripting language. It defines the form, function and position of a set of components. For example, a script consisting of two components, a label with the text "Michelangelo" and a checkbox for "allow email", might appear as follows:

<label fontsize="8" font="Times New Roman" text="Michaelangelo"/>
<checkbox state="checked" text="Allow email"/>

A tag may also have a scope that may or may not include the scopes of other tags. Thus the scope of a tag may precede or follow the scope of another tag, or it may be wholly contained or "nested" within the scope of another tag. The scope of a tag exists from the occurrence of the tag in the script to the occurrence of an "end tag" associated with the given tag. This is similar in concept to the behavior of brackets or parentheses in natural language. In XML, end tags have the same name as their corresponding tag but are preceded by a slash character. Thus </text> is the end tag for <text>.

The purpose of nested scopes is to allow components to be elements of other components. For example, a list of three checkboxes might appear as follows. Note that the scope of the list tag includes the three checkbox tags.

<list>
<checkbox text="Apples" />
<checkbox text="Oranges" />
<checkbox text="Bananas" />
</list>

In one embodiment, the present invention includes three tags that are used within the XML previously described. The three tags may be referred to as the "Reference" tag, the "ReferenceTemplate" tag, and the "ReferenceMerge" tag. Both the ReferenceTemplate tag and the ReferenceMerge tag have attributes. In one embodiment, these three tags do not themselves refer to UI components, but rather to the application of the data binding procedure to the tags that are within their scope. The ReferenceMerge tag appears inside the scope of a ReferenceTemplate tag and, similarly, the ReferenceTemplate tag appears inside the scope of a Reference tag. The set of tags within the scope of either a ReferenceTemplate tag or a ReferenceMerge tag is known as its "template".

Figure 4:
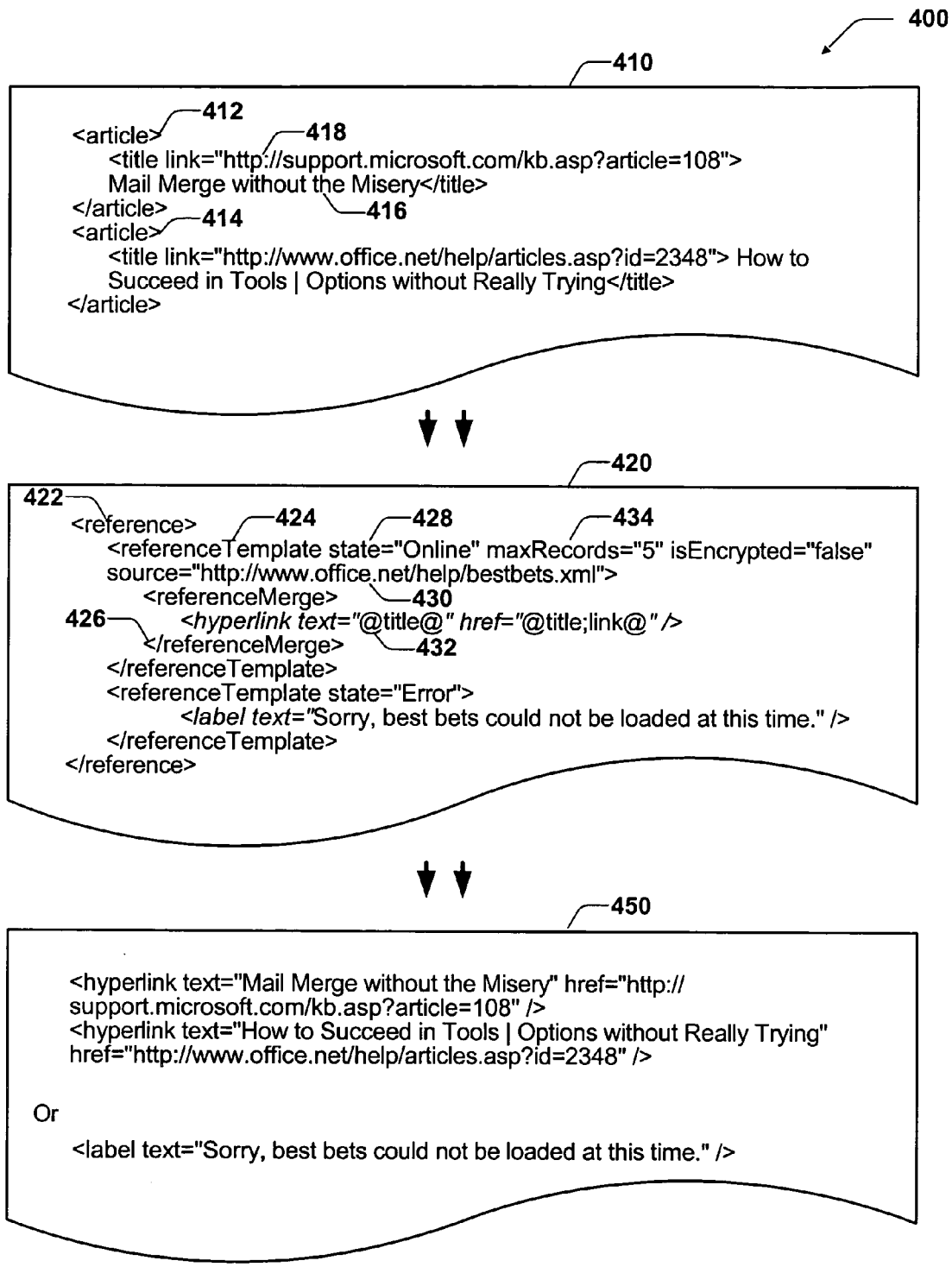
FIG. 4 illustrates an exemplary set of data, exemplary XML for UI display of the data, and the resultant output of the XML in accordance with the present invention.

FIG. 4 illustrates an exemplary set of data, exemplary XML for UI display of the data, and the resultant output of the XML in accordance with the present invention. The exemplary data 410 includes two articles (412, 414) that are identified by a title (e.g., 416) that is a hyperlink to the article according to the specified URL (e.g., 418). The exemplary XML 420 for display of the hyperlink data includes a Reference tag (e.g., 422), a ReferenceTemplate tag (e.g., 424), and a ReferenceMerge tag (e.g., 426). The resultant output 450 produces two hyperlinks with titles "Mail Merge without the Misery" and "How to Succeed in Tools|Options without Really Trying".

As may be seen from the example, the Reference tag (e.g., 422) has no attributes. The scope of a Reference tag is used to delineate those components to which the data binding is applied. In addition, each Reference tag includes an internal state, or "state of the reference", which may have any of several values. One instance of data binding defines the values "default", "online", "offline", "empty" and "error" as described in grater detail in the discussion of FIG. 3 above.

For any given state, the Reference tag (e.g., 422) may contain within its scope either zero or one occurrences of a ReferenceTemplate tag (e.g., 424) associated with that state. The scope of the ReferenceTemplate tag delineates those components that are included in the layout when that state is in effect. If the current state of the reference does not match the state associated with a given ReferenceTemplate tag then the components within the scope of the ReferenceTemplate tag are not displayed. The state of a ReferenceTemplate tag is determined by its "state" attribute (e.g., 428).

Another important attribute of the ReferenceTemplate tag is the "source" attribute (e.g., 430). The value of this attribute is the URL (Universal Resource Locator) string that specifies the data source that is queried for data.

Also shown in the XML 420 for displaying the hyperlink data are the placeholders (e.g., 432) indicating where the data is to be included. A placeholder is a reference to data returned from the external data source. When the data is obtained, the data is substituted for the placeholder before the component is created. In one implementation, it is assumed that data from an external data source is returned in XML format. In this implementation a placeholder has one of the following forms, @tag@

@tag;attribute@ where tag and attribute are the names of actual tags or attributes in the XML data. Note that the placeholder is identified by being surrounded by a "placeholder character" and if an attribute is specified it is separated from the tag by a "separator character". In the above example the placeholder character is the "@" sign and the separator character is the semicolon.

In another embodiment, the ReferenceTemplate tag (e.g., 424) may have an optional "interval" attribute that specifies how often the data binding is to be performed. The interval attribute is useful when the data in the external data source is changing with time. For example, the following ReferenceTemplate element would be updated every five seconds.

<ReferenceTemplate state="online" interval="5">
<label text="@name@" />
</ReferenceTemplate>

When a single data record is expected from a data source the ReferenceTemplate tag is sufficient to define a set of components that depend on the data.

However, as in the example shown, it is sometimes the case that a set of records rather than a single record can be retrieved from a data source, where the number of records returned cannot be predicted ahead of time. For instance, one might query an employee database for the set of records of employees that match some criterion. The ReferenceMerge tag (e.g., 426) handles multiple records. The scope of a ReferenceMerge tag defines a set of components that will be replicated and instantiated with data for each individual record that is obtained from the data source.

To control excessive replication when a large number of records is returned, it is possible to specify a value for a "maxrecords" attribute (e.g., 434) of the ReferenceMerge tag. In the present example, only five hyperlinks would be included in the list for display on the UI despite the number included in data 410.

In another embodiment, the ReferenceMerge tag may also have a "SkipPartialRecords" tag which has the value true or false. If set to true then partial records are skipped. If SkipPartialRecords is set to false (or not given) the record would be partially displayed in the UI despite missing a portion of the record.

The user interface script is usually transformed into a visible display by first converting it to an internal data structure known as a tree. The script and its corresponding tree are logically equivalent. Each form can be converted to the other without loss of essential information. The purpose of the tree structure is to make it easier to modify the elements of the display. It is computationally simpler and faster to add or delete elements of a tree than it is to edit a script.

The tags in the script become nodes of the tree and the attributes of the tags become properties of the nodes. In addition the scope relationships among the tags are modeled by the tree structure. Sequential tags become siblings in the tree and tags directly within the scope of an enclosing tag become child nodes of the enclosing tag's node. Ultimately the contents of the tree are converted to visible elements on the screen.

Generally when a script is processed the tags are immediately converted to nodes in the internal tree structure. However this behavior is not appropriate for tags within a data binding template since they may contain placeholders rather than actual data. A typical implementation is to store the template as a property of the data binding node rather than as a sub-tree (or set of sub-trees) of the node. It is possible to store the template in its original script format but it is generally more useful to convert it to its equivalent tree structure so that it becomes a disjoint "branch" that can be grafted to the main tree whenever it is convenient.

Once parsing of the script has been completed but before the tree is displayed, the templates of any default ReferenceTemplate nodes are retrieved and grafted to the tree. Then the tree can be displayed for the first time. Following this, the source attribute of the online ReferenceTemplate node of each reference is retrieved and a query is made to access the external data source. A link is made for each query to the reference from which it originated.

When a response from a query is received the form of the response will determine the state to which the reference should change. If no ReferenceTemplate template exists for the indicated state then no further action is taken and the state is not changed. If a template exists then either it is displayed immediately if no data binding is required, or else the data binding process is begun with the given template.

Figure 5:
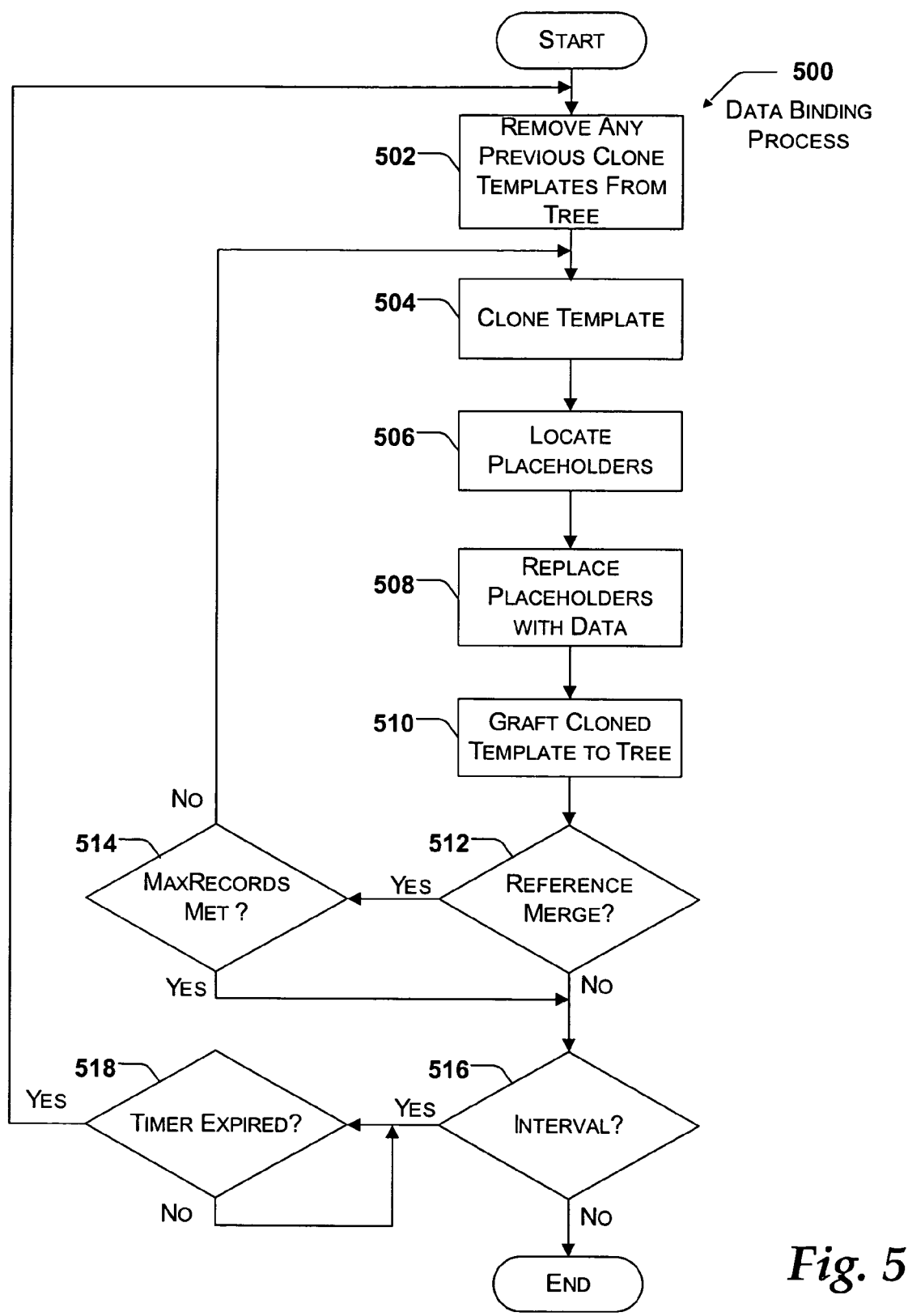
FIG. 5 is a flow diagram for an exemplary process for binding data to in a UI script in accordance with the present invention.

FIG. 5 is a flow diagram for an exemplary process for binding data to in a UI script in accordance with the present invention. Process 500 begins at a start block wherein a UI script has been written such that data binding from an external data source occurs prior to display of the UI. Processing continues at block 502.

At block 502, any previous clone templates that were grafted to the tree are removed from the tree. Removing the previously grafted clone templates from the tree allows the data binding process to commence with a tree where data binding has not yet occurred to avoid errors in the process. Once these previously cloned templates are removed, processing continues at block 504.

At block 504, the relevant ReferenceTemplate template is copied or "cloned". Cloning the template allows the original template to be available for subsequent iterations of the data binding process. After the template is cloned, processing continues at block 506.

At block 506, the placeholders within the UI script are located and associate with the corresponding data from the external data source. The process for retrieving the data from the data source is described in greater detail with relation to FIG. 2 above. Processing proceeds to block 508.

At block 508, the placeholders within the UI script are replaced with the data from the external data source in the cloned copy of the template. The cloned copy of the template now reflects the UI script with the data inserted. Processing continues at block 510.

At block 510 the cloned template is grafted to the tree of the UI script. In one embodiment, the cloned template replaces any previously grafted template. Processing then continues at decision block 512.

At decision block 512, a determination is made whether the ReferenceTemplate template includes a ReferenceMerge template or if the ReferenceMerge template has already been addressed. If the ReferenceTemplate template includes a ReferenceMerge template, processing moves to decision block 514. However, if the ReferenceTemplate template does not include a ReferenceMerge template, processing advances to decision block 516.

At decision block 514, a determination is made whether any MaxRecords attribute associated with the ReferenceMerge template has been met. For example, the MaxRecords attribute may indicate that only five records are to be retrieved from the external data source. Accordingly, when the MaxRecords attribute, no more records are retrieved. If the MaxRecords attribute associated with the ReferenceMerge template has not been met, processing returns to block 504 where the process is repeated for the next data record. However, if the MaxRecords attribute associated with the ReferenceMerge template has been met, processing advances to decision block 516.

At decision block 516, a determination is made whether an interval is associated with the template. If no interval is associated, processing continues to end block where process 500 ends. However, if an interval does exist, processing moves to decision block 518.

At decision block 518, a determination is made whether a timer associated with the interval has expired. The relevant interval value is retrieved, usually from either the interval attribute of the current state or the online state, and then a timer is started using the given value. When the timer goes off, processing returns to block 502 where process 500 is repeated. Otherwise, processing holds at decision block 518 where the state of the timer is monitored.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for binding data in a user interface (UI) script, comprising:
   generating a tree structure that corresponds to the UI script;
   automatically determining whether the tree structure includes cloned templates that were previously grafted to the tree structure and automatically removing any cloned templates that were previously grafted to the tree such that templates that already include data from an external data source are removed from the tree, wherein the tree structure is in a state where data binding has yet to occur and the cloned templates are removed before cloning a reference template;
   accessing the reference template;
   cloning the reference template to create a cloned reference template while maintaining the reference template such that the reference template is available for subsequent iterations of binding data;
   inserting the data into the cloned reference template;
   grafting the cloned reference template into the tree structure after the data has been inserted into the cloned reference template; and
   displaying a UI output according to the tree structure, whereby the UI output is dynamically updated with the data.

2. The computer-implemented method of claim 1, wherein the reference template includes a reference tag used to delineate components to which data binding is applied.

3. The computer-implemented method of claim 1, wherein cloning the reference template further comprises determining which portions of the tree structure correspond to a specified tag of the UI script.

4. The computer-implemented method of claim 3, wherein the specified tag has an associated attribute for retrieving multiple records for display in the UI output as a list of records.

5. The computer-implemented method of claim 3, wherein the specified tag has an associated attribute that specifies an interval for refreshing the data.

6. The computer-implemented method of claim 1, wherein inserting the data further comprises retrieving the data from an external data source.

7. The computer-implemented method of claim 6, wherein retrieving the data further comprises determining a location of the data according to a uniform resource locator (URL) within the UI script.

8. The computer-implemented method of claim 6, wherein retrieving the data further comprises passing a uniform resource locator (URL) that identifies a location of the data to a communication library.

9. The computer-implemented method of claim 1, wherein a state is associated with each portion of the tree structure in which data is inserted.

10. The computer-implemented method of claim 9, wherein a first component is displayed in the UI when the state corresponds to a first state, and a second component is displayed in the UI when the state corresponds to a second state.

11. A computer storage medium that includes computer-executable instructions for binding data to a user interface (UI) script, comprising:
  generating a tree structure that corresponds to the UI script;
  automatically determining whether the tree structure includes cloned templates that were previously grafted to the tree structure and automatically removing any cloned templates that were previously grafted to the tree such that templates that already include data from an external data source are removed from the tree, wherein the tree structure is in a state where data binding has yet to occur and the cloned templates are removed before cloning a reference template;
  cloning the reference template to create a cloned reference template while maintaining the reference template such that the reference template is available for subsequent iterations of binding data; wherein a portion of the reference template is associated with a portion of the UI script that includes a placeholder for data;
  replacing the placeholder in the cloned reference template with the data;
  grafting the cloned reference template into the tree structure; and
  displaying a UI output according to the tree structure, whereby the UI output is dynamically updated with the data.

12. The computer storage medium of claim 11, wherein the tree structure and the UI script are logically equivalent.

13. The computer storage medium of claim 11, wherein cloning the reference template further comprises determining which portions of the tree structure correspond to a specified tag of the UI script.

14. The computer storage medium of claim 13, wherein the specified tag has an associated attribute for retrieving multiple records for display in the UI output as a list of records.

15. The computer storage medium of claim 13, wherein the specified tag has an associated attribute that specifies an interval for refreshing the data.

16. The computer storage medium of claim 11, wherein replacing the placeholder further comprises retrieving the data from an external data source.

17. The computer storage medium of claim 16, wherein replacing the placeholder further comprises passing a uniform resource locator (URL) that identifies a location of the data to a communication library.

18. The computer storage medium of claim 11, wherein a state is associated with each portion of the tree structure in which a placeholder is present.

19. The computer storage medium of claim 18, wherein a first component is displayed in the UI when the state corresponds to a first state, and a second component is displayed in the UI when the state corresponds to a second state.

20. A system for binding data to a user interface (UI) script, comprising:
  memory;
  a target user interface device that includes a first application that is configured to:
  generate a tree structure that corresponds to the UI script;
  automatically determining whether the tree structure includes cloned templates that were previously grafted to the tree structure and automatically removing any cloned templates that were previously grafted to the tree such that templates that already include data from a separate data source are removed from the tree; wherein the tree structure is in a state where data binding has yet to occur and the previously grafted cloned templates are removed before cloning a reference template;
  cloning the reference template to create a cloned reference template while maintaining the reference template such that the reference template is available for subsequent iterations of binding data;
  inserting the data into the cloned reference template;
  grafting the cloned reference template into the tree structure after the data has been inserted; and
  displaying a UI output according to the tree structure, whereby the UI output is dynamically updated with the data.

21. The system of claim 20, wherein the application is further configured to determine which portions of the tree structure correspond to a specified tag of the UI script.

22. The system of claim 21, wherein the specified tag has an associated attribute for retrieving multiple records for display in the UI output as a list of records.

23. The system of claim 21, wherein the specified tag has an associated attribute that specifies an interval for refreshing the data.

24. The system of claim 20, wherein a state is associated with each portion of the tree structure in which data is inserted.

25. The system of claim 24, wherein a first component is displayed in the UI when the state corresponds to a first state, and a second component is displayed in the UI when the state corresponds to a second state.

* * * * *